United States Patent [19]

Frankus

[11] 4,358,869
[45] Nov. 16, 1982

[54] WIPER ARM DRIVING MECHANISM

[75] Inventor: Andrew Frankus, Valparaiso, Ind.

[73] Assignee: The Anderson Company of Indiana, Gary, Ind.

[21] Appl. No.: 275,326

[22] Filed: Jun. 19, 1981

[51] Int. Cl.$^3$ .............................................. B60S 1/24
[52] U.S. Cl. .................................... 15/250.3; 74/50; 15/250.34
[58] Field of Search ............ 15/250.3, 250.29, 250.34; 74/48, 50

[56] References Cited

U.S. PATENT DOCUMENTS

| | | | |
|---|---|---|---|
| 2,393,193 | 1/1946 | Sacchini | 74/50 |
| 2,494,538 | 1/1950 | Baldo | 15/250.3 X |
| 3,060,755 | 10/1962 | De Brosse et al. | |
| 3,741,004 | 6/1973 | Posakony | |
| 3,974,826 | 8/1976 | Eggleton et al. | |
| 4,103,556 | 8/1978 | Niday | |
| 4,120,291 | 10/1978 | Paton et al. | |
| 4,215,585 | 8/1980 | Kunii et al. | |

FOREIGN PATENT DOCUMENTS 866309 2/1953 Fed. Rep. of Germany ..... 15/250.3

*Primary Examiner*—Peter Feldman
*Attorney, Agent, or Firm*—Wegner, McCord, Wood & Dalton

[57] ABSTRACT

A driving mechanism for reciprocating a windshield wiper arm having maximum velocity at the mid-portion of the wiper stroke and zero velocity and minimum acceleration at the outboard ends of the stroke. The driving mechanism includes a slotted follower having a semicircular shape with ends pivotally secured to a housing. An output drive shaft extends from the motor housing and has a curved crank attached thereto for rotation. The crank includes a pin at one end which extends into the follower slot for converting the rotary motion of the output drive shaft into reciprocable motion of the follower. The follower transmits the reciprocable motion to a drive shaft connected to the wiper arm for reciprocating the wiper across the windshield surface.

7 Claims, 6 Drawing Figures

U.S. Patent Nov. 16, 1982 Sheet 1 of 2 4,358,869
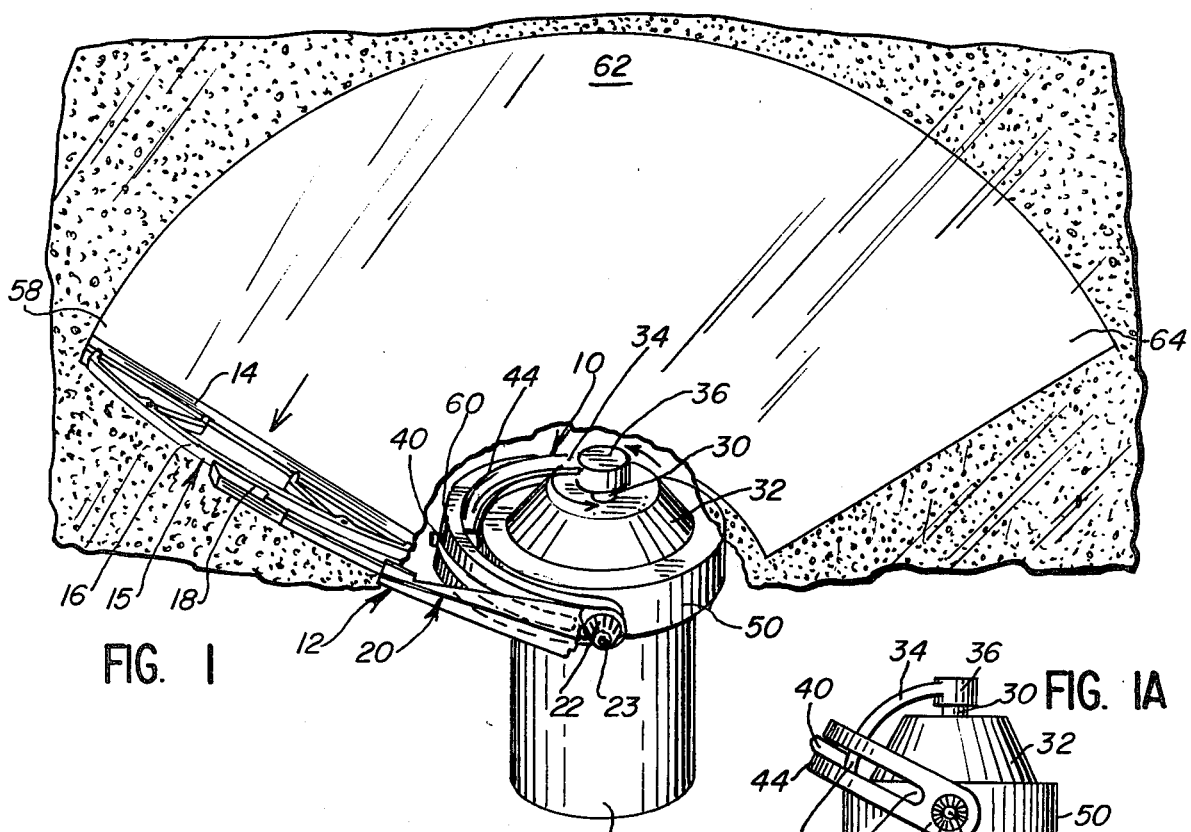
FIG. 1
FIG. 1A
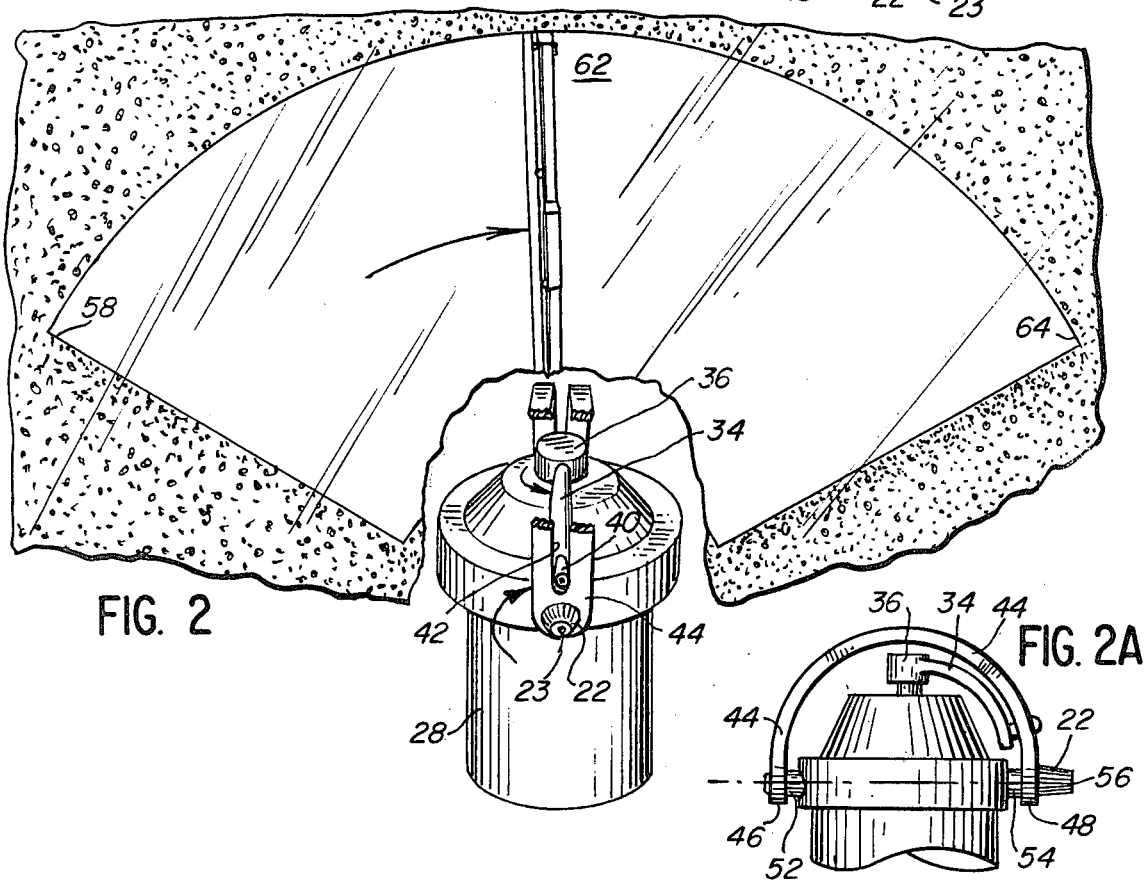
FIG. 2
FIG. 2A

WIPER ARM DRIVING MECHANISM

DESCRIPTION

Background of the Invention

This invention relates to a driving mechanism for reciprocating a windshield wiper arm having maximum acceleration at the mid-portion of the wiper stroke and minimum acceleration at the outboard ends of the stroke.

Conventional driving mechanisms for windshield wipers typically include a four-bar linkage assembly connecting a drive motor to a pair of wiper arms for reciprocation. The wiper motion produced by these four-bar linkage assemblies is characterized by a relatively high velocity and acceleration near the end of each wiper stroke with a large change in acceleration at the beginning of the reverse stroke. Because the wipers approach the outboard ends of the stroke at a relatively high acceleration, slapping occurs when the wipers suddenly stop at the end of the stroke. At the beginning of the reverse stroke the large change in acceleration causes a jerky wiper motion. This unsymmetrical and jerky wiper motion accelerates the wear on the mechanism. Further, under certain windshield surface conditions, the high velocity of the wiper as it approaches the outboard end of the wiper stroke causes the rubber element on the wiper blade not to flip over when the wiper direction reverses resulting in poor wiping.

SUMMARY OF THE INVENTION

In accordance with the present invention, the disadvantages of prior wiper arm driving mechanisms have been overcome.

The wiper arm driving mechanism of the invention produces a wiping motion characterized by a zero velocity and minimum acceleration near the outboard ends of the wiper stroke to eliminate slapping and to allow the wiping lip of the rubber wiper blade to flip over when the wiper direction reverses. The maximum wiper velocity and acceleration occurring at the midpoint of the wiper stroke to improve the quality of wiping and to minimize the obstruction to the visibility of the driver in the field of vision.

The wiper arm driving mechanism includes a slotted follower having a semi-circular shape with ends pivotally mounted on a drive motor housing. A rotating output drive shaft extends through one end of the motor housing and has a crank secured thereto. The crank has a pin at one end which extends into the slot of the follower for converting the rotating motion of the output shaft into reciprocating motion of the follower. The follower transmits the reciprocating motion to a drive shaft connected to the wiper arm for reciprocating the wiper across the surface of the windshield.

Further advantages of the invention will be apparent from the following specification and from the drawings in which:

FIG. 1 is a fragmentary perspective of a windshield wiper assembly and the driving mechanism of the present invention;

FIG. 1A is a partial side view of the driving mechanism of FIG. 1;

FIG. 2 is a fragmentary perspective of the driving mechanism and windshield wiper assembly at the midpoint of the wiper stroke;

FIG. 2A is a partial side view of the driving mechanism of FIG. 2;

Figure 3:
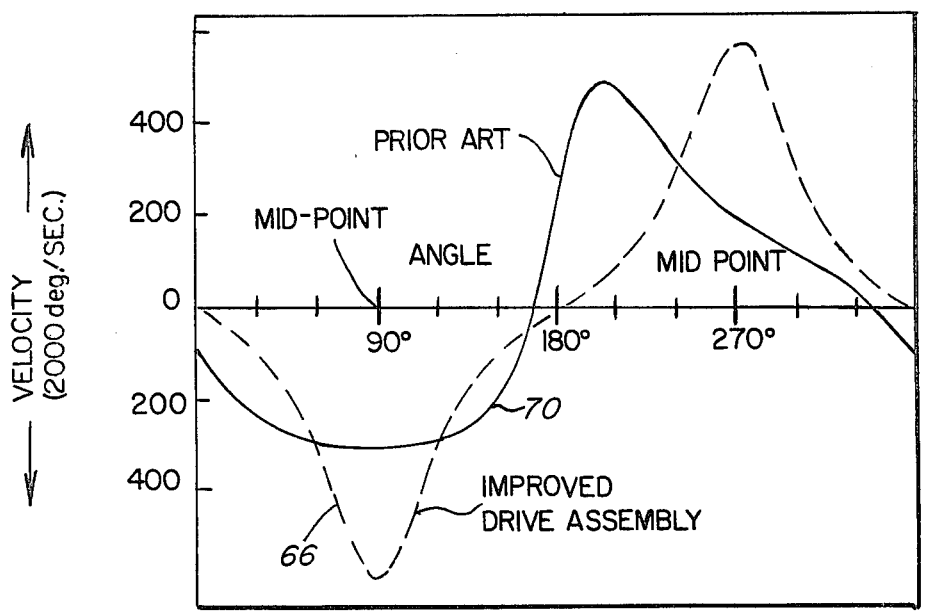
FIG. 3 is a graph of the wiper velocity produced by the driving mechanism of the present invention and of the wiper velocity produced by a prior conventional driving mechanism.

The driving mechanism, generally designated 10, of the present invention is illustrated in FIGS. 1 and 2 for driving a single conventional windshield wiper arm and blade assembly 12. The windshield wiper blade 15 of the assembly 12 includes a resilient wiping element 14, and a pressure applying superstructure 16. The pressure applying superstructure 16 is attached by a connector 18 to the outer end of a spring-biased wiper arm 20 which in turn is fastened on a drum head 22 on an oscillating drive shaft 23. The wiper arm drive shaft 23 is reciprocated by the driving mechanism 10 which is mounted, as by a bracket or the like (not shown), to the frame of the motor vehicle in a location in close proximity to the lower portion of the windshield. It is recognized that the driving mechanism 10 may be mounted for driving a wiper assembly 12 for a rear window, for a wiper assembly 12 operating from above a windshield, for a wiper assembly for a headlight, or the like.

The driving mechanism 10 includes a housing 28, which for the present purposes is illustrated as cylindrical in shape, for encasing a drive motor having a rotating output drive shaft 30 which shaft extends through a shaped end wall 32 of the housing. The drive motor may be an electric motor, a hydraulic motor, an air motor, or the like. A crank 34, which is shown curved in shape, has one end 36 secured to the output drive shaft 30 for rotation therewith and has a second end 38 from which a pin 40 extends outwardly. A follower 44 has a semi-circular or arcuate shape with ends 46 and 48 pivotally secured to the motor housing 28 by means of a mounting collar 50. The pin 40 fits through a slot 42 extending substantially the length of the arcuately shaped follower 44, the pin being slidable within the slot as the crank 34 is rotated by the shaft 30 to convert the rotary motion of the drive shaft 30 into reciprocable motion of the follower 44.

The mounting collar 50 is secured to the motor housing 28 adjacent the housing end 32 and has a pair of fixed, outwardly extending hollow sleeves 52 and 54 mounted on opposite sides thereof. The sleeves 52 and 54 rotatably receive the drive shaft 23 secured to the respective ends 46 and 48 of the follower 44 and define a pivot axis 56 about which the follower 44 reciprocates. The drum head 22 is fixed on the outer end of one drive shaft 23 for reciprocation with the follower 44 about the pivot axis 56. The pivot axis of the drum head and follower extends perpendicular to the drive shaft 30. The wiper arm drive shaft 23 is reciprocated with the follower 44 to impart reciprocating motion to the wiper arm 20 and wiper blade.

In operation, as the drive shaft 30 rotates the crank 34 in a counterclockwise direction, the pin 40 slides along the follower slot 42, reciprocating the follower 44 about the axis 56. The follower 44 defines a semispherical surface as it reciprocates, the pin 40 subscribing a circle on the semispherical surface. As seen in FIG. 1 when the wiper assembly 12 is at the outboard end 58 of a wiper stroke, the pin 40 is positioned within the slot 42 at the midpoint 60 of the follower 44. At the midpoint 60, the tangent to the circle defined by the pin 40 is parallel to the pivot axis 56 resulting in zero velocity and minimum acceleration of the follower 44, drive shaft 22 and wiper assembly 12.

As the crank shaft 34 continues to rotate in the counterclockwise direction to a point where the crank is aligned with the pivot axis 56, as seen in FIG. 2, the drive shaft 23 and wiper assembly 12 pivot in a clockwise direction to the midpoint 62 of the wiper stroke. At the midpoint 62 of the wiper stroke, the pin 40 is positioned near the end of the slot 42 such that the tangent at the pin position to the circle defined by the pin is perpendicular to the pivot axis 56 and the velocity of the pin 40 is substantially the same as the velocity of the arm 20 and blade 15. Thus, maximum velocity of the follower 44, drive shaft 22 and wiper assembly 12 occurs at the midpoint 62 of the wiper stroke.

Figure 4:
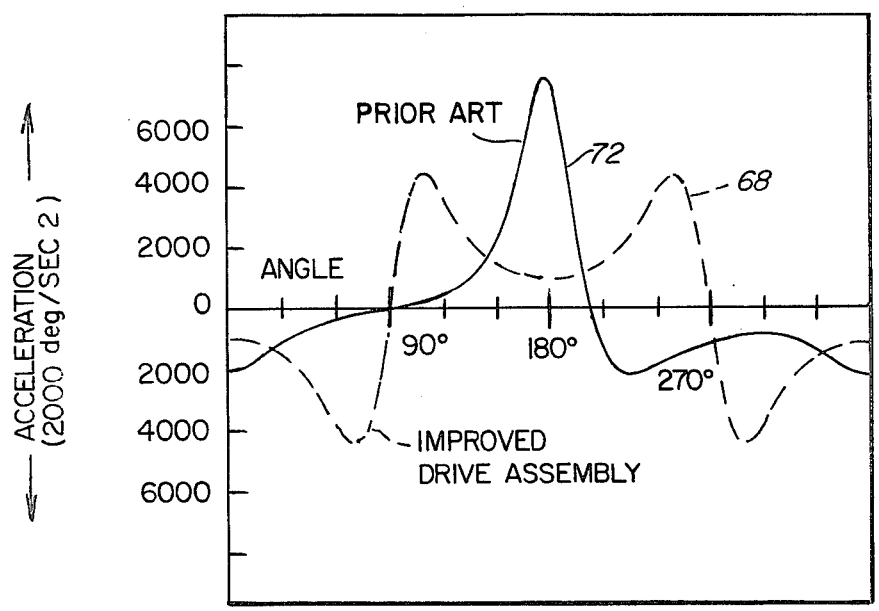
FIG. 4 is a graph of the wiper acceleration produced by the driving mechanism of the present invention and of the wiper acceleration produced by a conventional driving mechanism.

When the drive shaft 30 drives the crank 34 at a constant speed of rotation, the characteristics of the wiper motion produced by the driving mechanism 10 are symmetrical as seen in the dashed line curves on the graphs of FIGS. 3 and 4. The horizontal axis of the velocity graph of FIG. 3 and the acceleration graphs of FIG. 4 defines the crank angle wherein a 90° and 270° crank angle corresponds to the midpoint of the wiper stroke 62 as seen in FIG. 2. A crank angle of 0°, 180° and 360° corresponds to the respective outboard ends 64 and 58 of the wiper stroke in FIG. 2. The dashed curves 66 and 68 of FIGS. 3 and 4 correspond respectively to the wiper velocity and acceleration produced by the driving mechanism 10 of the present invention and the solid curves 70 and 72 correspond respectively to the wiper velocity and acceleration characteristically produced by a conventional prior art four-bar linkage driving assembly.

As seen from curve 66 of FIG. 3, the wiper velocity produced by the driving mechanism 10 is zero at the outboard ends of the stroke corresponding to 0°, 180° and 360°. This is opposed to the relatively high velocity produced by the prior four-bar linkage assembly near the end of the forward stroke corresponding to 180°. A high velocity near the point where the wiper reverses direction can cause the wiper blade to flip over under certain windshield surface conditions. This problem is eliminated by the driving mechanism 10 since the wiper velocity is zero at the point of direction reversal.

As seen in FIG. 4 from the acceleration curve 68 produced by the driving mechanism 10, the wiper slows down as it approaches the outboard ends of the stroke, 0°, 180° and 360°. Because of the minimum acceleration the wipers do not stop suddenly and slapping is eliminated. Further, the minimum change in acceleration near the outboard ends of the wiper stroke eliminate the jerky motion produced by the large change in acceleration shown at 180° by curve 72 for the prior four-bar linkages.

It is also seen from FIG. 3 that the velocity of the arm and blade is a maximum at the 90° point (area 62 on FIG. 2) which is in the general line of vision of the driver of the vehicle. The maximum velocity of the arm and blade past the line of vision is highly desirable as it reduces the interference the arm and blade will have on the driver.

In summary, the driving mechanism 10 of the present invention results in symmetrical wiper motion characteristics, eliminates slapping and jerky wiper motions to prolong the life of the mechanism and further prevents the wiper blade from flipping over when the wiper direction reverses.

Other aspects, objects and advantages of the invention can be obtained from a study of the drawings, the disclosure and the appended claims.

I claim:

1. A device for reciprocating a windshield wiper arm driven by a motor disposed with a housing comprising:
   a follower having a semicircular shape with first and second ends pivotally mounted on the housing about a common pivot axis;
   a driving member driven by the motor for rotation about an axis, said driving member engaging the follower to convert rotary motion of the motor into reciprocating motion of the follower; and
   a driven member mounted on the pivot axis of said follower for reciprocating motion therewith, said driven member being connected to the wiper arm to reciprocate the wiper arm as said driving member is rotated.

2. The device of claim 1 wherein the pivot axis of the driven member extends from the follower perpendicular to the axis of rotation of the driving member.

3. The reciprocating device of claim 1 wherein said follower has a slot therein extending from the first to the second ends, said driving member including a pin extending outwardly through the slot for engagement with the follower.

4. A device for reciprocating a windshield wiper arm driven by a motor disposed within a housing, comprising:
   a follower having first and second ends pivotally secured to the housing, said follower having a slot therein extending between said first and second ends;
   a driving member driven by the motor for rotation about an axis;
   means connected to said driving member and engaging the follower slot to convert the rotary motion of the driving member into reciprocating motion of the follower; and
   a driven member reciprocable with said follower and connected to the wiper arm to reciprocate the wiper arm as said driving member is rotated.

5. The device of claim 4 wherein said follower has a semicircular shape defining a semispherical surface as said follower is reciprocated.

6. The device of claim 4 wherein the means for converting rotary motion into reciprocating motion includes a crank extending outwardly from the driving member and being rotatable therewith, said crank having an outer end with a pin secured thereto, said pin being slidable within the follower slot as the crank rotates to reciprocate the follower.

7. The reciprocating device of claim 4 wherein the housing is cylindrical having an end through which the driving member extends, the driven member being mounted on the pivoting axis of the follower and extending perpendicular to the axis of the driving member.

* * * * *

UNITED STATES PATENT AND TRADEMARK OFFICE
CERTIFICATE OF CORRECTION

PATENT NO. : 4,358,869
DATED : November 16, 1982
INVENTOR(S) : Andrew Frankus

It is certified that error appears in the above-identified patent and that said Letters Patent are hereby corrected as shown below:

Claim 1, line 2, "with" should be --within--

Signed and Sealed this

First Day of March 1983

[SEAL]

Attest:

GERALD J. MOSSINGHOFF

Attesting Officer

Commissioner of Patents and Trademarks